US009560082B2

(12) United States Patent
Rasanen

(10) Patent No.: US 9,560,082 B2
(45) Date of Patent: Jan. 31, 2017

(54) METHOD AND NETWORK DEVICE ESTABLISHING A BINDING BETWEEN A PLURALITY OF SEPARATE SESSIONS IN A NETWORK

(75) Inventor: Juha Antero Rasanen, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 106 days.

(21) Appl. No.: 13/512,711

(22) PCT Filed: Nov. 30, 2009

(86) PCT No.: PCT/EP2009/066057
§ 371 (c)(1),
(2), (4) Date: May 30, 2012

(87) PCT Pub. No.: WO2011/063853
PCT Pub. Date: Jun. 3, 2011

(65) Prior Publication Data
US 2012/0239771 A1 Sep. 20, 2012

(51) Int. Cl.
H04L 29/06 (2006.01)
H04L 29/08 (2006.01)

(52) U.S. Cl.
CPC ....... *H04L 65/1016* (2013.01); *H04L 65/1073* (2013.01); *H04L 67/14* (2013.01)

(58) Field of Classification Search
CPC ................................................. H04L 65/1016
USPC ......... 709/206, 203; 713/168, 172; 370/389; 455/411
See application file for complete search history.

(56) References Cited

U.S. PATENT DOCUMENTS

| 2003/0229787 | A1* | 12/2003 | Gabor | 713/168 |
| 2006/0136557 | A1* | 6/2006 | Schaedler et al. | 709/203 |
| 2006/0205387 | A1* | 9/2006 | Laitinen | 455/411 |
| 2007/0043947 | A1* | 2/2007 | Mizikovsky et al. | 713/172 |

(Continued)

FOREIGN PATENT DOCUMENTS

EP   2056570 A1   5/2009

OTHER PUBLICATIONS

International Search Report and Written Opinion corresponding to International Patent Application No. PCT/EP2009/066057 dated Mar. 25, 2010.

(Continued)

Primary Examiner — Jerry Dennison
(74) Attorney, Agent, or Firm — Squire Patton Boggs (US) LLP

(57) ABSTRACT

The present invention relates to networks, in particular to communication networks. Moreover, the present invention relates to a method, to network devices, to a computer program product and to a computer-readable medium for establishing a binding for separate sessions. According to an exemplary embodiment of the present invention there is provided a method for establishing a binding between a plurality of separate sessions, the method comprises storing a first identity of a first level, storing a second identity of a second level, providing a correspondence between the first identity and the second identity, extracting the second identity from a first message, retrieving the stored first identity on the basis of the extracted second identity and establishing a binding between a first session of the first level and a second session of the second level on the basis of the retrieved first identity.

18 Claims, 8 Drawing Sheets

(56) References Cited

U.S. PATENT DOCUMENTS

2007/0113086 A1* 5/2007 Huang et al. ............... 713/168
2008/0198845 A1* 8/2008 Boman ....................... 370/389

OTHER PUBLICATIONS

3GPP TS 23.401 V8.7.0 (Sep. 2009) Technical Specification 3rd Generation Partnership Project; Technical Specification Group Services and System Aspects;General Packet Radio Service (GPRS) enhancements for Evolved Universal Terrestrial Radio Access Network (E-UTRAN) access (Release 8).

3GPP TS 23.228 V8.10.0 (Sep. 2009) Technical Specification 3rd Generation Partnership Project; Technical Specification Group Services and System Aspects; IP Multimedia Subsystem (IMS); Stage 2 (Release 8).

3GPP TS 23.402 V8.7.0 (Sep. 2009) Technical Specification 3rd Generation Partnership Project; Technical Specification Group Services and System Aspects; Architecture enhancements for non-3GPP accesses (Release 8).

* cited by examiner

METHOD AND NETWORK DEVICE ESTABLISHING A BINDING BETWEEN A PLURALITY OF SEPARATE SESSIONS IN A NETWORK

FIELD OF THE INVENTION

The present invention relates to networks, in particular to communication networks. Moreover, the present invention relates to a method, to network devices, to a computer program product and to a computer-readable medium for establishing a binding for separate sessions.

BACKGROUND OF THE INVENTION

In view of an increasing number of communication technologies and technological concepts in use, there is a trend of convergence of networks and systems based on such different technologies and concepts into overall network systems. Examples for such different technologies may include GPRS (General Packet Radio Service) or CDMA (Code Divisional Multiple Access) or, in general, IP-based (IP: Internet Protocol) mobile or fixed networks. Further, there is a trend of convergence of different services, functions and applications into overall network systems. Such converged network systems are often referred to as next generation networks. Examples for such next generation networks include networks specified by 3GPP (Third Generation Partnership Project) or IETF (Internet Engineering Task Force) or TISPAN (Telecom and Internet Converged Services and Protocols for Advanced Networks).

An example of standardization efforts in this field includes the 3GPP work on system architecture evolution (SAE) and/or long-term evolution (LTE). This work includes among others GPRS enhancements for E-UTRAN (Evolved Universal Terrestrial Radio Access Network) access, as for example specified in 3GPP TS 23.401 V8.7.0, and architecture enhancements for non-3GPP access, as for example specified in 3GPP TS 23.402 V8.7.0.

The specification 3GPP TS 23.401, covers both roaming and non-roaming scenarios and related aspects, including mobility between E-UTRAN and pre-E-UTRAN 3GPP radio access technologies, policy control and charging, and authentication. The specification 3GPP TS 23.402 specifies a provision of IP connectivity using non-3GPP accesses to the evolved 3GPP packet-switched domain.

In a network a plurality of sessions may be provided for a single network device or user.

SUMMARY OF THE INVENTION

It is an object of the present invention to provide a method and means for handling a plurality of sessions in a more efficient way.

According to an exemplary embodiment of the present invention there is provided a method for establishing a binding between a plurality of separate sessions storing a first identity of a first level, storing a second identity of a second level, providing a correspondence between the first identity and the second identity, extracting the second identity from a first message, retrieving the stored first identity on the basis of the extracted second identity and establishing a binding between a first session of the first level and a second session of the second level on the basis of the retrieved first identity.

A binding between a plurality of separate sessions may be an efficient way to handle a plurality of sessions in a network.

Such a binding may provide several advantages when combining two or more separate sessions. The two or more separate sessions may use different parameters, such as a first identity in the first level and a second identity in the second level. The retrieved first identity, which may be for example a user identity or an UE identity may be utilized to perform session binding.

In order to provide a binding or a combination of the sessions one of the given parameter may be used, for example the first identity of the first level. The method may provide a common parameter or identity for at least two sessions. It may be an efficient way when utilizing one of the parameters of one level or one session also as a parameter in the other level or other session. With such a solution no further or additional parameter would be necessary, since an already existing parameter of one level may be available for the other level. By providing a correspondence between the both identities, it may be possible to utilize the first parameter of the first level also in the second level. The first parameter or first identity and the second parameter or identity may originate or belong to the same device or network device or user. In other words, allocating a common control to sessions of the same network device or user may be provided.

The retrieved first identity may be utilized for finding a common function or network device in order bind entities. For example the retrieved first identity may be utilized for finding a common PCRF entity (policy and charging rules function) for entities like AF, PCEF, BBERF (AF: application function, BBERF: bearer binding and event reporting function) and other network devices serving a user or UE (user equipment). A selected PCRF as common entity may utilize a user identity to bind an application level session (PCRF-AF) with one or more user plane sessions, like PCRF-PCRF or PCRF-BBERF related sessions.

The first identity as well as the second identity may be stored in one single register, for example a register of a server. In this register a correspondence may be provided between the first identity and the second identity. The retrieved first identity may be provided by the register. It may be foreseen that the correspondence may be provided by a table or correspondence list within the register. In another exemplary embodiment the first identity and the second identity may be stored in different registers and also within different devices, wherein a correspondence may be provided by a link between the first identity and the second identity.

The first message may be a message, which may be of a user related procedure. Moreover, a binding may be provided for a policy-controlled session, for example a policy-controlled session of a user or an UE. Thus, establishing a binding may be a binding for a policy-controlled session of a user or an UE to a policy control entity or a policy and charging control entity. A policy control entity may be an S-CSCF, a P-CSCF, a PCRF cloud or a PCRF cloud/DRA or in general a network entity or a network device controlling a user session. It may be possible that a P-CSCF as well as an S-CSCF is a session control entity and a policy control entity at the same time.

The method may be user initiated and/or network initiated. The initiation may depend on e.g. the direction of a session establishment, i.e. whether the user or UE initiates the session establishment or receives a session invitation or on the nature of the procedure, e.g. attachment of a UE to a network, registration of a UE/user, authorization, authentication, etc. Moreover, the method may be suitable for non-roaming situations and roaming situations.

According to an exemplary embodiment of the present invention the method may further comprise sending the first message comprising the second identity, wherein the second identity may be an identity on a network device or on a user.

A user identity may identify the user, i.e. the subscriber who has a subscription to services offered by a network. An example of a user identity may be an IMSI, i.e. the International Mobile Subscriber Identity. An IMSI may comprise an MCC (mobile country code), an MNC (mobile network code) and an MSIN (mobile subscriber identification number). Further examples of user identities may be private and public user identities of IMS.

A UE identity may identify a user equipment (UE), i.e. the terminal, attached to a network and used by a user for communication. An example of a UE identity may be IMEI, i.e. International Mobile station Equipment Identity. An IMEI may comprise a TAC (type allocation code) and a SNR (serial number).

When a user may use only one UE/terminal, a user identity alone (or the UE identity alone), may in practice identify the user and/or the UE/terminal and the related sessions, i.e. the user identity may be used as a user or UE identity When a user may use more than one UE/terminal, each terminal having a session or connection to a network, the user identity may be the same for each terminals and may be not sufficient to separate the UEs/terminals (and sessions at each terminal) from each other. If such a separation may be required, the UE identity can be used.

A UE identity and user identity may indicate the origin of a message or a request. Thus in the following no differentiation is made between a UE identity and a user identity.

It may be foreseen that the first identity of the first level and the second identity of the second level may identify the same user or the same user equipment or the same UE (user equipment) or the same terminal. In this context a user, user equipment, a UE, terminal and user terminal may be treated in the same way and may be exchangeable.

It may be provided binding an application session or an IMS session or a SIP session to the user plane session of the same user or UE or to the media plane session of the same user or the UE. The user or media plane session may be for example an IP-CAN session.

According to an exemplary embodiment of the present invention the method may further comprise establishing a binding of a first session in the first level and of a second session in the second level by selecting a policy control entity based on the retrieved first identity.

It may be foreseen that one session may be performed in the first level, for example the user or media plane level, and one other session may be performed in the second level, for example an application level. The sessions may be performed at the same time. With the method a policy control management may be provided by combining a control policy management in the first level and a second control policy management in the second level. A user, such as a UE, may utilize the control policy management in order to receive a service related to both levels or to both layers. For providing a control policy management a policy control entity may be selected. There may be a plurality of policy control entities in the network, such as a PCRF entity. Moreover, a policy control entity may be an S-CSCF, a P-CSCF, a PCRF cloud or a PCRF cloud/DRA or in general a network entity or network device controlling a user session.

According to an exemplary embodiment of the present invention the method may further comprise selecting a common policy and charging control function for two network devices serving the user.

The retrieved identity or user identity may be utilized for finding a common policy and charging control function for at least two network entities, wherein this two network entities or network devices may serve a user or an UE.

According to an exemplary embodiment of the present invention the method may further comprise sending the first message in a user related procedure, wherein the user related procedure may be at least one procedure selected from the group of procedures consisting of a registration, an authentication, an authorization, a session establishment and an attachment to a network.

A procedure may be part of a session, for example a part of a session setup. A session may comprise several procedures including sending messages, receiving messages and evaluating messages.

A registration procedure may be performed when a user and/or a UE may attach to a network which may prepare a service for the attaching arriving user. An authentication procedure may be performed in order to authenticate the user using identification information stored in the network. Moreover, an authorization procedure may be performed e.g. in the case the service(s) requested by the user needs a user specific permission from a network. A session establishment may be utilized in order to establish a session between a user/UE and an application server or another user, for example the session being initiated either by the user/UE itself or by the other party.

According to an exemplary embodiment of the present invention it may be foreseen that storing the first identity and storing the second identity may be performed in a home network of the user and wherein retrieving the second identity from the first message may be performed in a visited network.

A network device or network apparatus may be for example a control entity, which may retrieve an identity. It may be possible that the network device retrieving the second identity is located in a visited network and the data register holding the identities is located in the user's home network. Thus, a roaming situation may be handled in addition to non-roaming situations.

According to an exemplary embodiment of the present invention the method may further comprise replying in response to the first message with a second message comprising the first identity.

The first message may be received by a server, for example a HSS (home subscriber server) or an AAA server (authentication, authorization and accounting server). The second message may be sent from the server to a session control entity, such as an S-CSCF (serving call session control function) within a network.

According to an exemplary embodiment of the present invention the method may further comprise sending the retrieved first identity to a first session control entity.

The first identity may be retrieved from a register and may be sent to a second session control entity, which may be an S-CSCF or a P-CSCF.

According to an exemplary embodiment of the present invention the method may further comprise forwarding the first identity from the first session control entity to a second session control entity.

The first session control entity may be an S-CSCF or a P-CSCF. In addition, the second control entity may be an S-CSCF or a P-CSCF. The control entity may comprise further functions, for example enforcement functions.

According to an exemplary embodiment of the present invention the method may further comprise sending a third message from a session control entity to a policy control entity, wherein the third message comprises the second identity.

It may be possible that the policy control entity may be the first policy control entity. Moreover, the control entity may be the first control entity, for example an S-CSCF. Furthermore, the control entity may be the second control entity, for example a P-CSCF. Thus, the method may comprise sending a third message from a session control entity to the policy control entity, wherein the third message may comprise the second identity.

The third message comprising the second identity may be received by a third policy control entity. The policy control entity may be a PCRF cloud/DRA. The policy control entity, e.g. a PCRF cloud/DRA, may use the second identity for retrieving a corresponding first identity. The second identity may be sent to the PCRF cloud/DRA and the PCRF cloud/DRA itself may retrieve the first identity to select a PCRF. The third message may be for example a request message. The PCRF cloud/DRA may be a third policy control entity which may be utilized in addition to an S-CSF and to a P-CSCF in the network.

According to an exemplary embodiment of the present invention the method may further comprise sending a fourth message from the session control entity to a policy control entity, wherein the fourth message may comprise the retrieved first identity.

The fourth message may be for example a request message. The policy control entity may be a PCRF cloud/DRA or a selected policy control entity upon a selection based on the retrieved first identity. The session control entity may be the first session control entity. It may also be foreseen that the session control entity is the second session control entity.

Thus, it may be provided a method comprising sending the fourth message, comprising the retrieved first identity, from the second session control entity to a policy control entity.

According to an exemplary embodiment of the present invention the method may further comprise performing an information exchange between a session control entity and the policy control entity, wherein the information exchange may comprise the retrieved first identity.

The information exchange may take place between the first session control entity and the policy control entity or between the second control entity and the policy control entity. The policy entity may be a selected entity upon a selection based on the retrieved first identity.

According to an exemplary embodiment of the present invention the first identity and/or the second identity may be at least one identity selected from the group of identities consisting of an international code, a international identity, a country code, a country code of a user identity, a network code, a network code of a user identity, an International Mobile Subscriber Identity (IMSI), a mobile country code, (MCC), a mobile network code (MNC) and a mobile subscriber identification number (MSIN), a private identity, a private identity, private user identity, a private user identity of IMS, a public identity, a public user identity, a public user identity of IMS, a UE identity, a International Mobile station Equipment Identity (IMEI), a type allocation code (TAC), a serial number (SNR), an IP address, number part of an identity, a number part of a user identity and a range number.

The first identity and the second identity may be different. Moreover, the first identity and the second identity may be utilized in different levels of communication, i.e. in a first level and in a second level.

The first identity or first user identity may be for example an IMSI, which may identify the user or the UE within a global network. The second identity or second user identity may be a further user identity, which may be for example a public user ID, a private user ID or an IP address. In general, the identity or UE identity or user identity may identify the user or the UE, i.e. the terminal or both the user and the user equipment (UE).

According to an exemplary embodiment of the present invention there is provided a network device comprising a processor, wherein the processor may be adapted to store a first identity of a first level in a register, to store a second identity of a second level in the register and to provide a correspondence between the first identity and the second identity. Moreover, the processor may be adapted to extract the second identity from a first message, to retrieve the first identity from the register corresponding to the extracted second identity, to reply with a second message comprising the first identity in response to the first message for establishing a binding between a first session of the first level and a second session of the second level on the basis of the retrieved first identity.

A network device or network entity may be a network device which may provide e.g. a session control function, policy enforcement function, bearer binding and event reporting function or policy and/or charging control function. A session control entity may be for example an AF or a P-CSCF. A policy enforcement function may be e.g. a PCEF. A bearer binding and event reporting function may be e.g. a BBERF. These network entities may reside within the home network of a user or in a visited network. A network entity may also be a further policy control entity PCRF of a network serving the user or the UE, i.e. in a visited network. In such a roaming case there may be two PCRFs policy controlling the UE, one PCRF in the home network of the user/UE and another PCRF in the visited network where the UE is roaming. The PCRF in the home network and the PCRF in the visited network may need to know/find each other in order to be able to communicate with each other.

A network device or network entity serving the user may be for example a session control entity like an AF/P-CSCF, a policy and charging enforcement entity like a PCEF, a bearer binding and event reporting entity like a BBERF or another policy and charging control entity like a PCRF. For example a roaming condition may create a situation where the PCRFs may serve the same user, one PCRF in the home network and another PCRF in the visited network.

The network device may be a server, for example an AAA-server or a HSS installed in the network or any other kind of entity serving the user or UE.

According to an exemplary embodiment of the present invention there is provided a network device comprising a processor, wherein the processor may be adapted to send a first message comprising a second identity of the second level, to receive a second message comprising a first identity of a first level in response of sending the first message, wherein a correspondence between the first identity and the second identity may be established. Moreover, the processor may be adapted to send a third message comprising the first identity for establishing a binding between a first session of the first level and a second session of the second level on the basis of the first identity.

The network device may be a P-CSCF, an AF/P-CSCF, a P-CSCF or AF/P-CSCF in the network.

It may be foreseen to provide a correspondence between the first identity and the second identity within a register of a network device. Moreover, the first message may be triggered by a user initiated procedure.

According to an exemplary embodiment of the present invention there is provided a network device comprising a processor, wherein the processor may be adapted to receive a first message comprising a first identity of a first level from a network device of a second level, to establish a binding between a first session of the first level and a second session of the second level on the basis of the first identity.

The network device may be a P-CRF, PCRF or a PCRF/DRA.

According to an exemplary embodiment of the present invention there is provided a network device comprising a processor, wherein the processor may be adapted to receive a first message comprising a second identity of a second level, to forward the first message to a register, to receive a second message comprising a first identity of a first level in response to the first message, wherein a correspondence between the first identity and the second identity may be established for a session binding between a first session of the first level and a second session of the second level on the basis of the first identity.

The network device may be for example a P-PCRF or a PCRF/DRA. The first message may be forwarded by the network device, for example without any change in the content of the information within the message.

The session binding may be a binding for a policy-controlled session of the second level of a user/UE to a policy control entity on the basis of the received first identity of the first level.

According to an exemplary embodiment of the present invention the network device may be at least one network device selected from the group of network devices consisting of a server, a home subscriber server (HSS), a AAA, an identity manager, a data repository, a proxi call session control server function entity (P-CSCF), an application function entity (AF), a policy and charging control function entity (PCRF), a serving call session control function entity (S-CSCF), a gateway (GW), a policy enforcement function entity (PCEF) (50), a DRA, a UE (10), a policy control entity, a cloud (40) and a bearer binding and event reporting function entity (BBERF).

The entities or network devices may provide a certain function, such as for example a proxi call session control server function (P-CSCF). Thus this kind of entity is called proxi call session control server function entity (P-CSCF). It may be also foreseen that a combination of those functions, i.e. AF, P-CSCF, S-CSCF and BBERF, are provided within one entity or network device.

It may be foreseen that the data repository is a user data repository in a mobile network. It may also be possible that the data repository is a subscriber data repository in a mobile network.

According to an exemplary embodiment of the present invention there may be provided a computer program product comprising code portions for causing a network device, on which the computer program may be executed, to carry out the method according to an example of the present invention.

According to an exemplary embodiment of the present invention there may be provided a computer-readable medium embodying the computer program product according to an example of the invention.

BRIEF DESCRIPTION OF THE DRAWINGS

In the following, the present invention will be described in more detail by way of examples with reference to the accompanying drawings, in which.

DETAILED DESCRIPTION OF EMBODIMENTS OF THE PRESENT INVENTION

Figure 1:
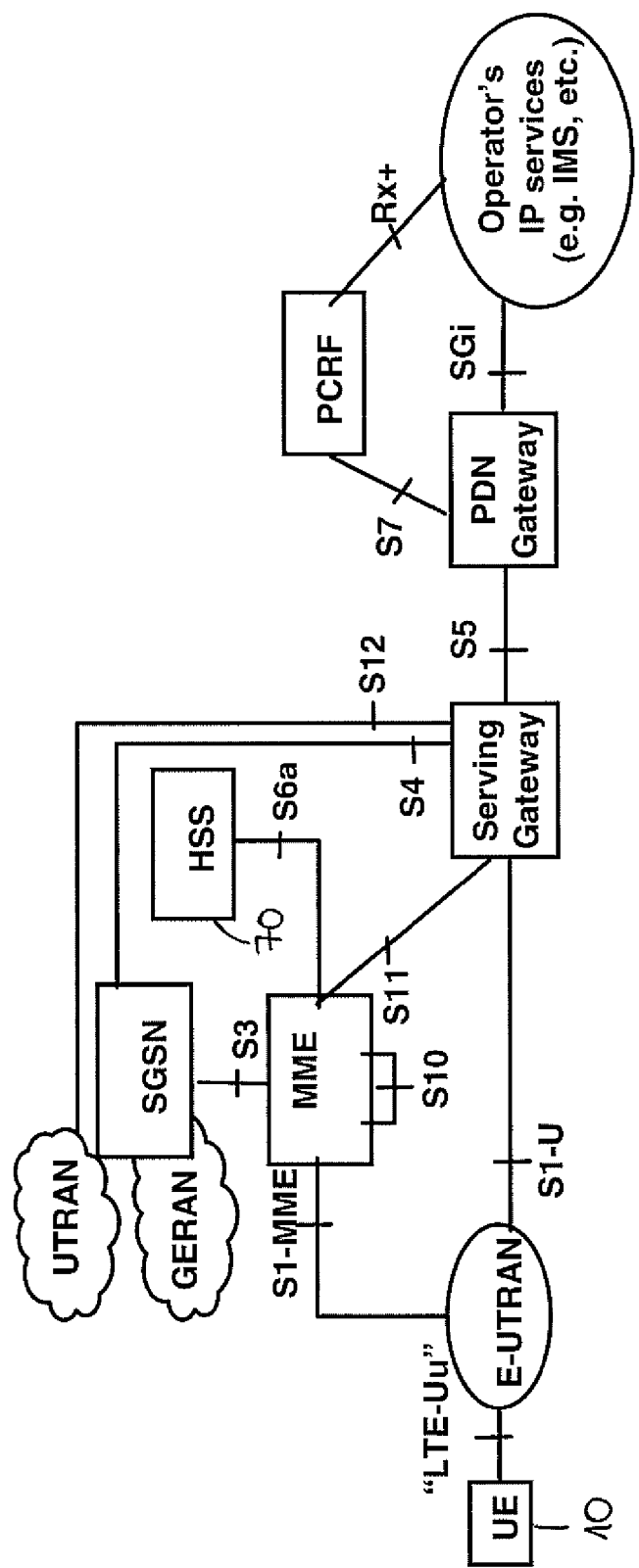
FIG. 1 illustrates a schematic block diagram of an architecture reference model for a non-roaming scenario according to an exemplary embodiment.

The present invention is described herein with reference to particular non-limiting examples. A person skilled in the art will appreciate that the invention is not limited to these examples, and may be more broadly applied.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The illustration of the drawings is schematic. In different drawings, similar or identical elements are provided with the same reference numerals.

The terms "data", "content", "information", "parameter", "message" and similar terms may be used interchangeably, according to some example embodiments of the present invention, to refer to data capable of being transmitted, received, operated on, and/or stored. In addition the terms "plane" and "level" and similar terms may be used interchangeably in this context, according to some example embodiments of the present invention. Furthermore, the terms "user", "UE", "user equipment", "terminal" and similar terms may be used interchangeably in this context according to some example embodiments of the present invention. Moreover, the terms "identity", "user identity", "UE identity", "identification", "user identification", "ID", "user ID" "UE ID", "user identification parameter", "user identifier parameter", "user identifier", "UE identifier", "user/UE identifier", "user identity information" and similar terms may be used interchangeably in this context according to some example embodiments of the present invention.

In particular, the present invention and its embodiments are mainly described in relation to an evolved network architecture with multiple access technologies, as e.g.

known from system architecture evolution (SAE) and/or long-term evolution (LTE) standardized by 3GPP. As such, the description of the embodiments given herein specifically refers to terminology which is directly related thereto. In this regard, for example, policy and charging control is taken as a non-limiting example, and thus respective functions such as policy and charging control functions (PCRF) as well as policy and charging enforcement functions (PCEF) or bearer binding and event reporting functions (BBERF) are used as non-limiting examples for control entities, policy control entities or network devices, while any other control entities or network devices may also be utilized as long as compliant with the described features and environment.

In particular, the present invention and its embodiments are mainly described in relation to an IP Multimedia Subsystem (IMS) used as a non-limiting example for a network configuration. As such, the description of the embodiments given herein specifically refers to terminology which is directly related to IMS. In this regard, SIP (session initiation protocol) terminology is used for session signaling purposes, while any other session signaling mechanism may also be utilized as long as compliant with the described features and environment.

Such terminology is only used in the context of the presented non-limiting examples, and does naturally not limit the invention in any way.

Figure 2:
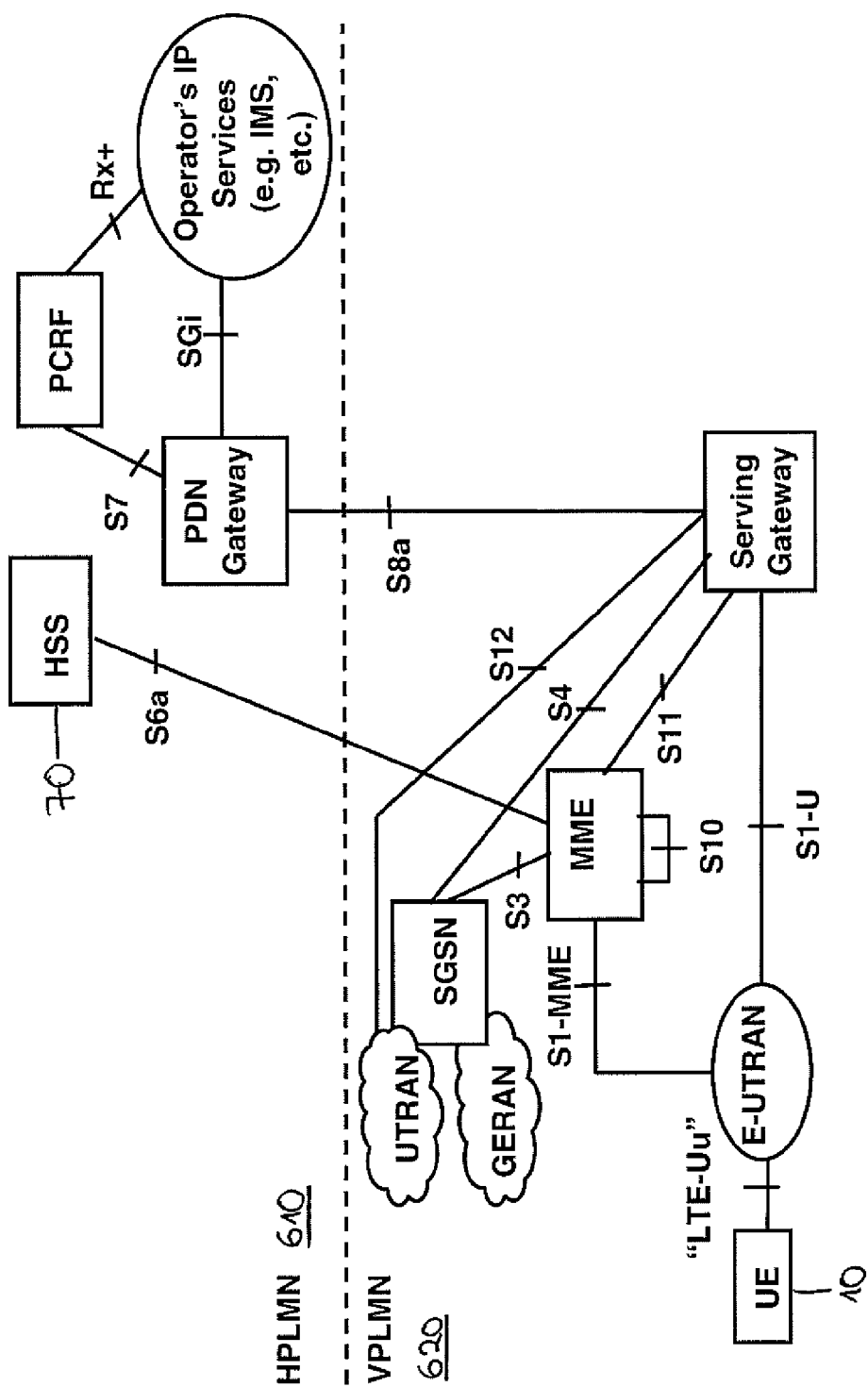
FIG. 2 illustrates a schematic block diagram of an architecture reference model for a roaming scenario according to an exemplary embodiment.

FIG. 1 depicts a schematic block diagram of an architecture reference model for a non-roaming scenario, and FIG. 2 depicts a schematic block diagram of an architecture reference model for a roaming scenario, as specified for example in 3GPP TS 23.401, and as underlying the present application. FIG. 2 illustrates a schematic block diagram of an architecture reference model for a roaming scenario according to an exemplary embodiment, wherein in some roaming scenarios there is a PCRF in both the home network and the visited network with an interface between the PCRFs, the visited PCRF controlling the Serving Gateway and the home PCRF controlling the PDN gateway.

In FIGS. 1 and 2, the abbreviations used are as follows: UE stands for user equipment, SGSN stands for serving GPRS support node, MME stands for mobility management entity, UTRAN stands for universal terrestrial radio access network, GERAN stands for GSM EDGE (Enhanced Data rate for GSM Evolution) radio access network, HSS stands for home subscriber server, PDN stands for packet data network, PCRF stands for policy and charging rules function, IMS stands for IP multimedia subsystem, HPLMN and VPLMN stand for home and visited public land mobile network, respectively.

It is to be understood that the architecture reference models of FIGS. 1 and 2 are examples for the description and the understanding of the present invention. The present invention may however equally be applied to or in architectures which are different from those as depicted.

As is illustrated in FIGS. 1 and 2, the IP multimedia subsystem (IMS) is an example of a communication network in relation to which the principles described herein may be applied. An IMS network may be considered as a non-limiting example of an IP-based delivery platform for the provision of IP multimedia services including audio, video, text, chat, etc. For details on IMS, reference is made to the specification 3GPP TS 23.228 V8.10.0. In an IMS network, the session initiation protocol (SIP) may be employed as a session control protocol, and the Diameter protocol specified by the IETF may be employed as an authentication protocol, and may be used for accessing and retrieving the user profile in the core IMS.

As is also illustrated in FIGS. 1 and 2, system architecture evolution may involve different access networks, e.g. UTRAN and GERAN. Various accesses, i.e. access networks and/or technologies, may allocate different IP addresses to user equipment 10 (UE). Thus, user equipment may have/communicate different media or different sessions simultaneously through different accesses. This may lead to certain problems e.g. as regards policy and charging control (PCC).

Namely, a network or system, comprising both home and visited networks, may have several policy and charging rules functions (PCRF), but the same PCRF may be supposed to control the media and sessions of a given terminal/user equipment to avoid complicated synchronization mechanisms between different PCRFs.

Figure 3:
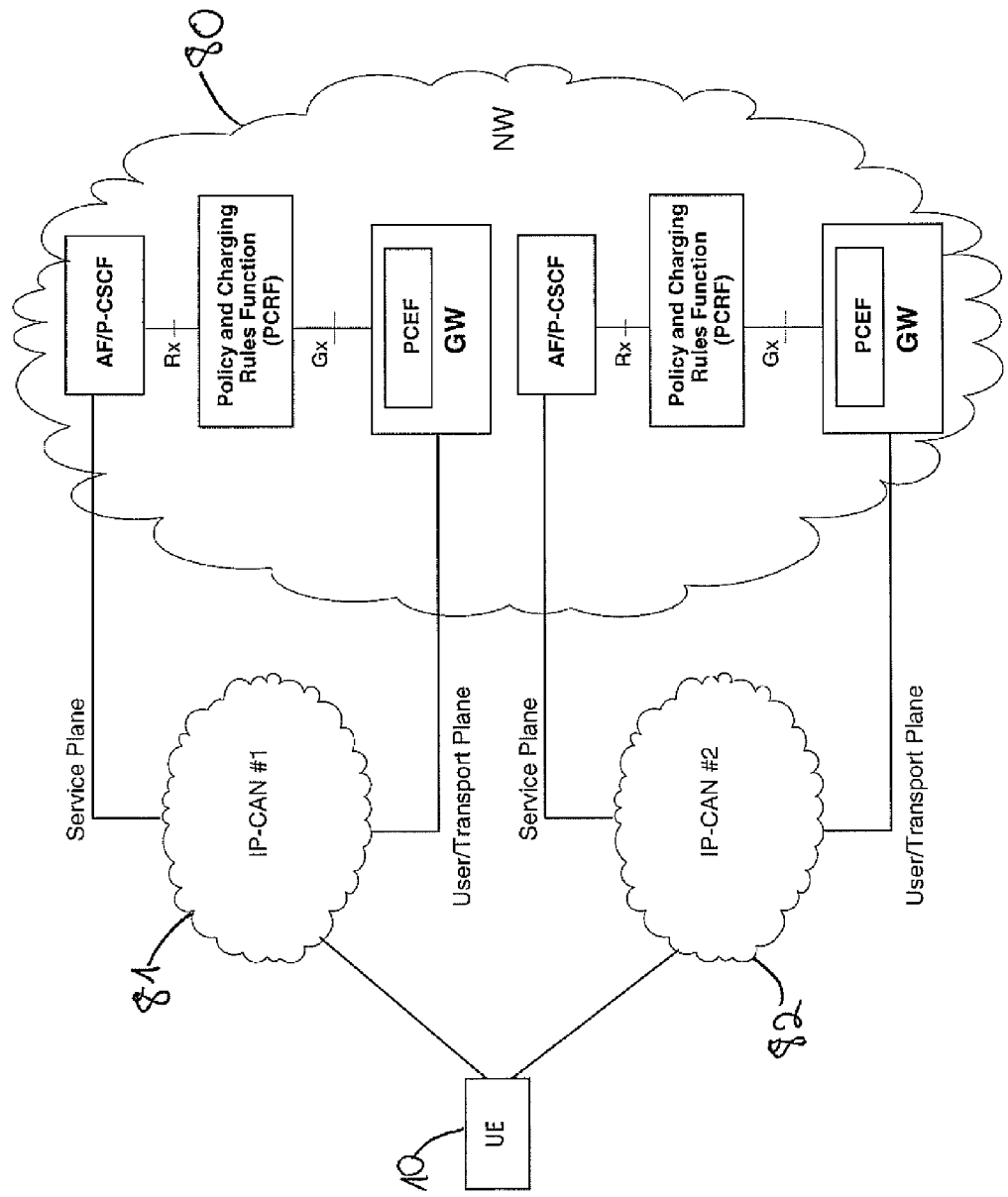
FIG. 3 illustrates a schematic block diagram of a logical policy control architecture in a system with multiple accesses according to an exemplary embodiment.

FIG. 3 depicts a schematic block diagram of a logical policy control architecture in a system with multiple accesses. According to FIG. 3, a user equipment 10 (UE) is simultaneously connected with a network system (NW) 80 via a first access network 81 and a second access network, 82 e.g. IP connectivity access networks (IP-CAN). The policy and charging control may depend on the access network, via which the connection is established. Thus, the policy and charging control for the first connection via IP-CAN#1 81 may be handled by a first set of an application function (AF) and/or proxy call session control function (P-CSCF), a policy and charging rules function (PCRF), and a gateway (GW) including a policy and charging enforcement function (PCEF), whereas the policy and charging control for the second connection via IP-CAN#2 82 may be handled by a separate second set of AF/P-CSCF, PCRF and GW/PCEF.

Figure 4:
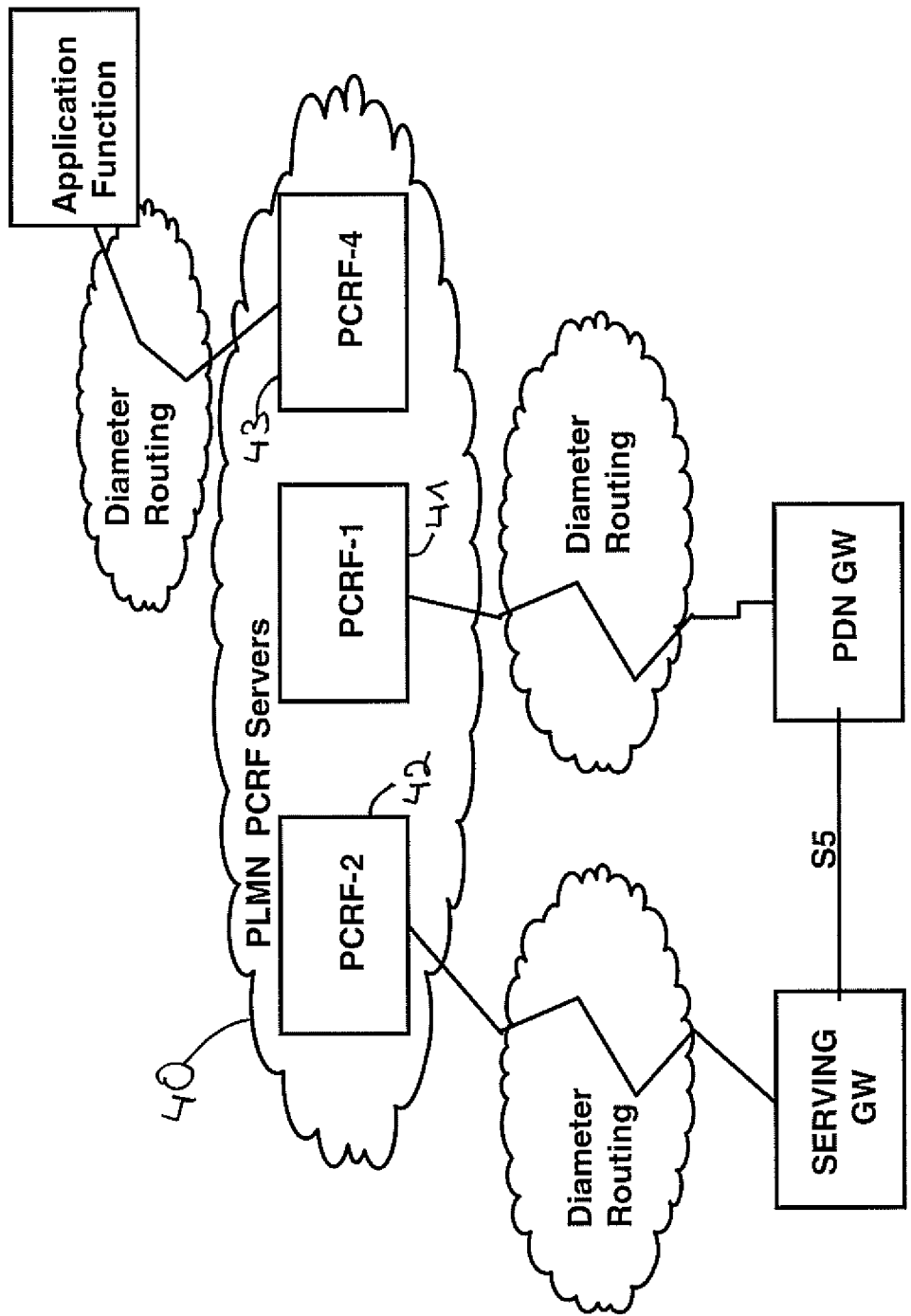
FIG. 4 illustrates a schematic architectural overview on the basis of the architecture reference model of FIG. 1 or 2 according to an exemplary embodiment.

This situation is also illustrated by FIG. 4 which depicts a schematic architectural overview on the basis of the architecture reference model of FIG. 1 or 2.

For overcoming the problems related to the existence of a plurality of policy control entities in a network, it may be necessary that all related network elements (like GWs, AF, visited PCRF) find a common PCRF 41, 42, 43. Therefore the concept of a "cloud of PCRFs" may be utilized.

Figure 5:
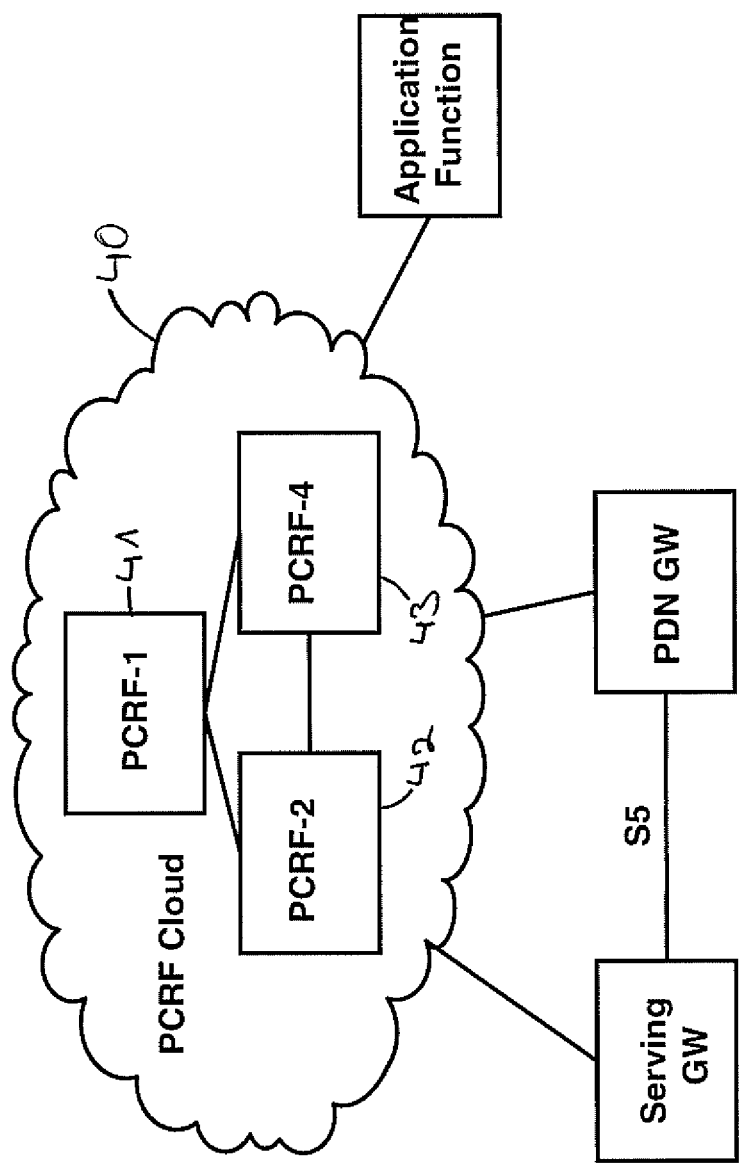
FIG. 5 illustrates a schematic architectural overview of the concept of a PCRF cloud based on the situation according to FIG. 4.

FIG. 5 depicts a schematic architectural overview of the concept of a PCRF cloud 40 based on the situation according to FIG. 4.

Within this concept the element contacting a PCRF may need to know only the address or contact information to the cloud of PCRFs 40. The cloud of PCRFs 40 may then solve the issue of allocating the same PCRF 41, 42, 43 to policy control sessions of the same user or user equipment 10.

In this context, it may be foreseen for example to use standard Diameter realm-based routing or to push an initial PCRF selection around the network. When policy control may be applied in an IMS network there may occur problems concerning the allocation of user sessions to a common policy control entity.

On the one hand, the IP address of a user equipment 10 may not be used as a user identity to correlate between media streams or sessions of the user equipment using different accesses. This may be the case because the IP address allocated to the user equipment 10 may be different in different accesses. Namely, a freely assignable address allocated to the user equipment 10 by a certain access may not lead to the same PCRF 41, 42, 43 as another freely assignable address allocated by another access. And further, the user equipment 10 may also have several different IP addresses, e.g. IPv4 and IPv6 addresses. An IP address used on the application/session level (e.g. IMS/SIP level) may be different from the IP address(es) used on the user/media/transport plane. In such a case an IP address cannot be used to correlate between an application/session level and user/media/transport plane.

The use of an IP address to find a common PCRF 41, 42, 43 may be one solution. But this solution may be suitable if the same IP address is used on both the application level and the user plane and even then only in a non-roaming scenario. In a roaming scenario different network elements/functions (e.g. AF/P-CSCF, PCEF, BBERF) may be in a different network (i.e. in a home network and in a visited network). Using the same pre-configured rules for selecting a common PCRF 41, 42, 43 would be a challenging agreement and configuration task for operators.

On the other hand, the IMS/SIP session establishment and the 3GPP user/transport plane bearer establishment (PDP (packet data protocol) context establishment) may not have a common parameter suitable for user identification. Thus, there may be not available any means that could be used by the PCRF cloud 40 to bind/connect an IMS/SIP session (controlled e.g. by the AF/P-CSCF) and the user/transport plane (handled e.g. by various gateways) to the same PCRF.

Accordingly, the exemplary embodiments of the present invention may provide solutions in the lack of unique and appropriate means for allocating the same PCRF 41, 42, 43 to policy control sessions, for example of the same user or user equipment 10.

When policy control is applied in an IMS network, or in general in a network where both the application level (with an AF/application function) and a user plane (with PCEF/policy enforcement function) need to communicate with a policy control function (PCRF), the IMS/SIP session establishment (or in general the application session establishment) and the user plane bearer establishment (e.g. PDP context establishment) may not necessarily have a common user identification parameter that could be used by the PCRF cloud 40 to bind/connect the SIP or application session (controlled by the AF/P-CSCF) and the user plane (handled e.g. by various gateways) to the same PCRF. For example in case of 3GPP IMS, the user plane uses IMSI as a user/UE ID and the ISIM based IMS plane uses an IMS private user ID which do not have to correlate with each other.

Figure 6:
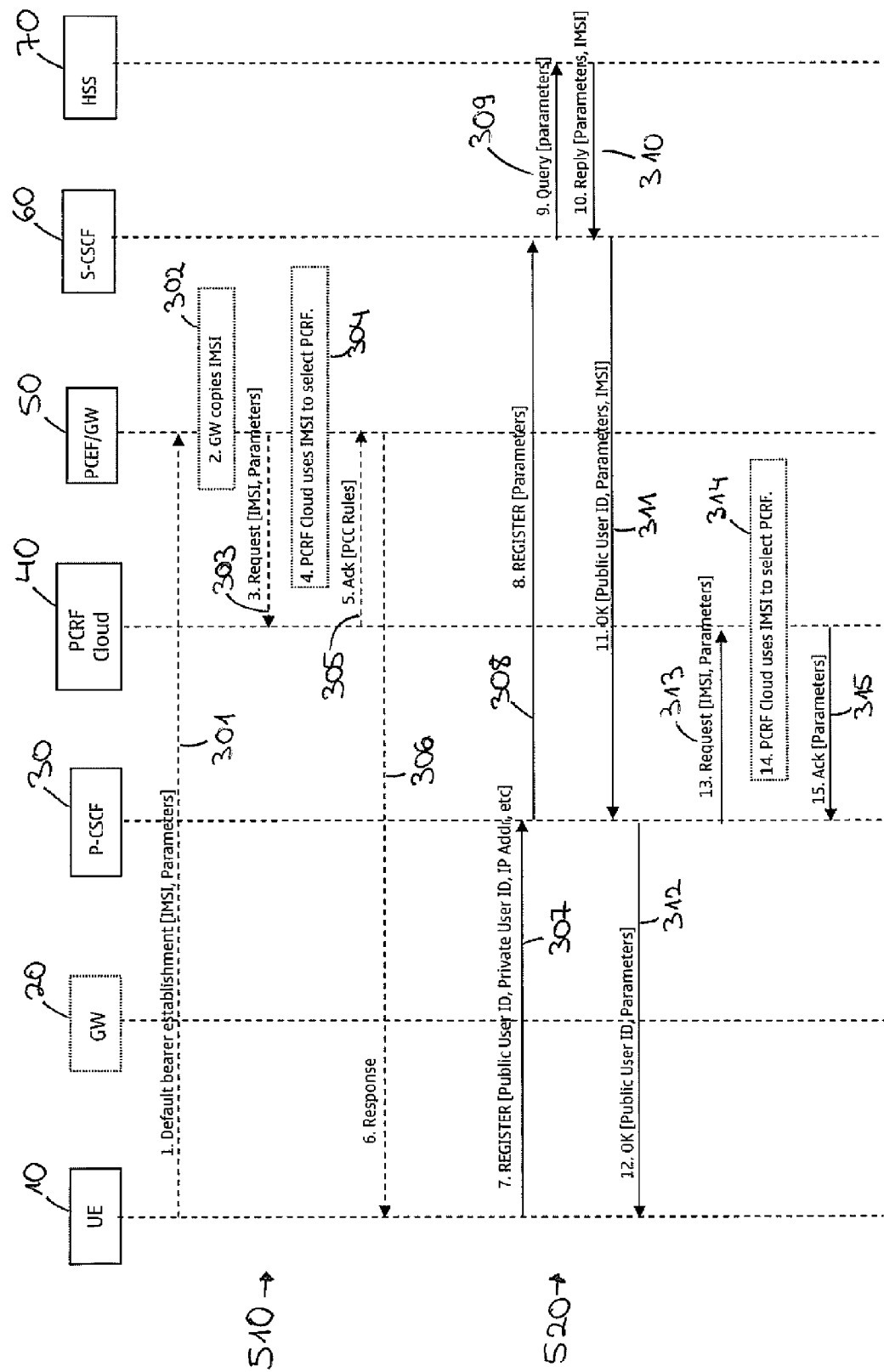
FIG. 6 illustrates a message flow diagram for control sessions of a user, in which one exemplary embodiment of the present invention is presented, FIG. 7 illustrate a network device according to an exemplary embodiment of the present invention.

FIG. 6 depicts a message flow diagram or a signaling diagram for control sessions of a user, in which an embodiment of the present invention is utilized. The arrows between the blocks illustrate a physical connection therebetween as well as the direction of signal flows therebetween. FIG. 6 shows messages 301, 303, 305, 306, which may be sent and received on a first level 510, which may be a user plane or media plane level. Moreover FIG. 6 shows messages 307, 308, 309, 310, 311, 312, 313, 315, which may be sent and received on a second level 520, which may be an application plane or application level. In the network of FIG. 6 several network devices 100 are present, which are network devices 20, 30, 40, 50, 60, 70. In addition a user equipment (UE) 10 which may also be understood as a network device 100 may perform a first session on the first level 510 and a second session on the second level 520. In FIG. 6 the messages 301, 303, 305, 306, 307, 308, 309, 310, 311, 312, 313, 315 and in addition actions 302, 304, 314 may be part of these two sessions. The actions 302, 304 may be performed on the first level and the action 314 may be performed on the second level, wherein the term first and second of the level does not indicate any ranking or hierarchy.

FIG. 6 illustrates a simplified example of getting user/UE identifiers 210, 220 for a PCRF cloud 40 or a PCRF Cloud/DRA for binding separate control sessions towards the cloud 40 to the same PCRF entity 41, 42, 43 in a policy controlled IMS session. A PCRF cloud 40 may comprise a diameter routing agent (DRA) or may be connected to a DRA. Moreover the PCRF cloud may comprise a plurality of PCRF entities 41, 42, 43. As shown in FIG. 4 and FIG. 5 the PCRF cloud 40 or the cloud 40 may comprise a first PCRF entity 41 (PCRF-1), a second PCRF entity 42 (PCRF-2) and a third PCRF entity (PCRF-4). Furthermore the PCRF cloud 40 may be connected with an application function (AF) or an application function entity directly as illustrated in FIG. 5 or for example over a DRA as illustrated in FIG. 4.

The system architecture underlying the example of FIG. 6 is as follows. The user equipment UE 10 may be connected with a P-CSCF 30 or an AF/P-CSCF (AF: application function). In 3GPP IMS environment the application function is known as a proxy call session control function or P-CSCF 30, whereas the term application function/AF may be a generally used expression for any application related server or function. Further, the user equipment (UE) 10 may be connected with a policy and charging enforcement function gateway entity (PCEF/GS) 50. The P-CSCF 30 may be connected with a set of policy control entities, i.e. a plurality of policy and charging rules functions entities (PCRFs) 41, 42, 43 being denoted by "PCRF cloud" 40. Further, the (AF/)P-CSCF 30 may be connected with a serving call session control function (S-CSCF) 60, and the PCRF cloud 40 may be connected with the PCEF/GW entity 50. Moreover, a HSS 70 may be connected with the S-CSCF 60.

In the following several steps of FIG. 6 are described in more detail. It should be noted that these steps may be not necessarily utilized in the order as shown and also further steps may be implemented in relation to additional functionalities or supporting the separate control sessions.

According to the example of FIG. 6, there occurs a sequence of a default bearer establishment (steps 1 to 6) and an IMS session registration/session handling/IMS, i.e. establishment or modification/ a bearer handling, i.e. establishment or modification (steps 7 to 15). The IMS session registration and the IMS session handling pertain to the service plane, and the bearer establishment pertains to the user/transport plane.

For default bearer establishment, the user equipment UE 10 attaches to the network, i.e. the PCEF/GW entity 50, and a default bearer is established (step 1). Thus, in step 1 of FIG. 6 the UE 10 may attach the network and a default bearer may be established. Subsequently, the PCEF/GW 50 entity takes a user identity information, e.g. IMSI from the bearer establishment message (step 2), possibly requests policy and charging control (PCC) rule(s) from the PCRF cloud 40 and thus sends the user identity information or first identity 210, e.g. IMSI to the PCRF cloud 40 (step 3). In other words, in step 2 the PCEF/GW 50 takes the IMSI or first identity 210 from the bearer establishment message and in step 3 the PCEF/GW 50 possibly requests PCC rule(s) from the PCRF cloud 40 and sends the IMSI to the PCRF Cloud/DRA 40.

In step 4 the PCRF cloud 40 uses IMSI to select a PCRF 41, 42 or 43. This means that in step 4 the PCRF Cloud/DRA 40 uses the IMSI to select one of the PCRFs PCRF 41, 42, 43 for the session of the user/UE 10. In response thereto and in response to step 3, the selected PCRF 41, 42 or 43 may respond by possibly sending the requested PCC rule(s) in step 5. Then, in step 6, the PCEF/GW entity 50 responds to the user-initiated default bearer establishment. With other words, in step 5 the PCRF cloud 40 responds possibly sending PCC rule(s) within an acknowledge message and in step 6 the PCEF/GW 50 responds to the default bearer establishment sending a response message.

Depending on how the PCRF 41, 42, 43 is selected within the PCRF cloud 40, the message exchange in steps 3 and 5 in FIG. 6 may comprise more messages, e.g. the PCEF/GW 50 getting first the address or identity of the selected PCRF 41, 42, 43 and then contacting the selected PCRF 41, 42, 43 (for example the first PCRF 41) to get the PCC rules. Then the PCEF/GW 50 also may know the selected PCRF (for example the first PCRF 41) and can send further requests, e.g. when dedicated bearers are established to the correct PCRF.

For IMS session registration on an application level, the user equipment UE 10 registers to the IMS network part by way of a session registration message to the P-CSCF entity 30 (step 7). Thus, in step 7 the UE 10 registers to IMS. The registration message may be a REGISTER message according to the SIP protocol, which may comprise as parameters e.g. a public user identity IMPU, a private user identity IMPI, and/or an IP address of the user.

In step 8, the P-CSCF entity 30 sends the register message or registration message to the S-CSCF 60. In step 9 the S-CSCF 60 performs a query to the home subscriber server HSS 70. The HSS 70 replies thereto, wherein the response includes the first user identity 210, in this example IMSI (step 10). In other words, in step 10 the HSS 70 fetches the IMSI corresponding to the IMS identity parameters of the query message and includes the IMSI in the reply message to the S-CSCF entity 60. The S-CSCF entity 60 may store the thus received first identity 210. Then, in step 11, the S-CSCF entity 60 forwards the IMSI identity to the P-CSCF 30 by sending an ok message or a SIP OK or "200 OK" message including the first identity 210 or IMSI identity of the UE 10. This means that in step 11 the S-CSCF 60 acknowledges to the P-CSCF 30. The response comprises the IMSI of the UE 10. Thus, a binding of policy-controlled IMS sessions of the user or UE 10 may be established to the PCRF cloud 40, i.e. to a policy control entity 41, 42, 43, (which may be also a logical policy control entity) by way of the user identifier, e.g. the IMSI of the user 10. That is, a PCRF discovery is achieved, thus enabling to contact the same PCRF 41, 42, 43 as the other network elements relevant to the user session(s) of the UE 10. And further, the selected PCRF 41, 42, 43 (for example the first PCFR 41) can use the user identity (here the IMSI) to bind the application/IMS/SIP session with the user/media plane (i.e. the IP-CAN session).

In step 12 the P-CSCF 30 acknowledges the registration to the UE 10. In step 13 the P-CSCF 30 contacts the PCRF Cloud/DRA 40 e.g. to subscribe to a Notification of Signaling Path Status or to push session information (received in a SIP INVITE, not shown in the figure) and includes the IMSI in the request to the PCRF Cloud/DRA 40. In step 14 the PCRF Cloud/DRA 40 uses the IMSI or first identity 210 to select a PCRF 41, 42 or 43 for the session of the user/UE 10. Because the same user/UE ID, the first identity 210, (i.e. IMSI) is used as in step 4, both the IMS application level (as second level in this example) and the user plane (as first level in this example) are bound to the same PCRF (for example the first PCRF 41). In step 15 the selected PCRF (in this example the first PCRF 41) of the PCRF cloud 40 acknowledges to the P-CSCF 30.

With other words, the user/UE ID(s) or the first identity 210 used in the user plane and the user/UE ID(s) or the second identity 220 used in the application level are stored in a register 180, e.g. of a HSS 70 or of an AAA server. When the UE 10 performs an IMS registration (or an authentication and/or authorization request) identifying itself with an IMS/application level user/UE ID, the register may include in a response of the related register enquiry a corresponding user plane user/UE ID.

The AF/P-CSCF or P-CSCF 30 may extract the user plane user/UE ID from the reply message and may send the user plane user/UE ID (instead of the currently in 3GPP specifications used IMS user ID) towards the PCRF 41, 42, 43 or DRA or PCRF cloud 40, when contacting one of the PCRFs 41, 42, 43 or PCRF cloud 40 for the first time. The PCRF 41, 42, 43 or the PCRF cloud 40 or the DRA may receive the same user/UE ID for a given user/UE 10 from both the application level and the user plane or user level and may therefore be able to bind the clients (AF, PCEF) to the same PCRF or PCRF element (for example to the first PCRF 41 or PCRF-1).

IMS is here only an example of an application level system. In case of other application systems/functions the relevant regular registration or authentication/authorization messages may be utilized to acquire the user plane user/UE ID from a register to the AF and further to the PCRF. Moreover, IMSI is here only an example of a possible user/UE ID or identity used in the user plane. Other kinds of user/UE IDs may be stored in the register 180 and acquired in the same way. Furthermore, registration messages and authentication and/or authorization messages are used here as examples. However, other regular protocol messages could be used in a similar way to acquire the user/UE IDs from a register 180, meaning acquiring the first identity 210 and a second identity 220 originating from different levels for session binding but identifying the same user or UE 10.

The user/UE ID(s) 210 used in the user plane may be stored with the user/UE ID(s) 220 used in the application level in a relevant register 180 (HSS or AAA or the like), which may be used also for different purposes in the system or network when the user/UE 10 attaches/registers into the system or to the network.

It may be foreseen that regular messages (e.g. IMS registration or AAA authentication/authorization requests) may be used. The user/UE ID 210 used in the user plane may be added to such messages as an optional parameter guaranteeing backwards compatibility. Certain interfaces may have a feature negotiation mechanism to guarantee backwards compatibility.

In other words, FIG. 6 illustrates a simplified example of getting user identification parameters, especially the first identity 210 or first user identity, here an IMSI, for a PCRF cloud 40 for binding separate control sessions towards the PCRF cloud 40 to the same PCRF entity 41, 42, 43 (for example the first PCRF 41) within the PCRF cloud 40. The PCRF entity 41, 42, 43 or the PCRF cloud 40 may also use the received first user identity 210 to bind the user/media/transport plane to an IMS/SIP session, i.e. perform session binding later. This example in FIG. 6 is based on the assumption of a policy-controlled IMS/SIP session in an evolved system architecture. The example of FIG. 6 is further based on the assumption of a non-roaming case, i.e. the user being located in its home network, and a user-initiated bearer establishment. However, roaming cases as illustrated in FIG. 2 may also be possible according to exemplary embodiments of the present invention.

The PCRF cloud 40 may use e.g. one or more of the following criteria to select a PCRF entity 41, 42, 43 from the cloud of PCRFs 40: Certain country codes of the user identifier lead to a certain PCRF, certain network codes of the user identifier lead to a certain PCRF, the number part of the user identifier is used for selecting a certain PCRF (to get a more randomized distribution between the PCRF entities e.g. to balance the loading) e.g. so that certain ranges lead to a certain PCRF, checking whether a PCRF has already been allocated for the user identity and selecting the same PCRF for requests with the same user identity.

As the above-described signaling of FIG. 6 only represents one non-limiting example of a utilization of an embodiment of the present invention, the following variations and modifications may be realized by further embodiments of the present invention.

According to an other exemplary embodiment of the present invention the AF/P-CSCF 30 itself may use the user identification, i.e. the user identification parameter or user identity 210, 220 retrieved from a register 180 of a further network device 100, for example from the HSS 70, for selecting a PCRF entity 41, 42 or 43 from among the available PCRF 41, 42, 43, etc. entities in the network, i.e. from the PCRF cloud 40. When other related network elements or network devices (e.g. gateways/PCEFs or the another network's PCRF) aiming at selecting the same PCRF entity use the user identifier and same criteria for the selection, the entities may end up selecting the same PCRF entity 41, 42, 43 (for example the first PCRF 41). The order of selections may also be vice versa. Namely, firstly a gateway/PCEF may use the user identification, i.e. the user identification parameter obtained during bearer handling, for selecting a PCRF entity 41, 42 or 43 from among the available PCRF entities 41, 42, 43 in the network, i.e. from the PCRF cloud 40. When other related network elements (e.g. AF/P-CSCF 30 or the another network's PCRF) aiming at selecting the same PCRF entity use (for example PCRF 41) the user identifier and same criteria for the selection, the entities may end up selecting the same PCRF entity (for example PCRF 41).

The selection criteria could be for example one or more of the following: Certain country codes of the user identifier may lead to a certain PCRF, certain network codes of the user identifier may lead to a certain PCRF, the number part of the user identifier may be used for selecting a certain PCRF (to get a more randomized distribution between the PCRF entities e.g. to balance the loading) e.g. so that certain ranges may lead to a certain PCRF.

The home network PCRF may also send the information (e.g. the user identification parameter, the session information from the session message exchange) to the "PCRF cloud" of the visited network. Such a sending without a prior request is known as a "push operation" in 3GPP specifications. The PCRF cloud of the visited network may use the user identification parameter for selecting a PCRF entity within the PCRF cloud. The same selection criteria may be used by other network entities (e.g. PCEFs/gateways) aiming at using the same PCRF entity.

The selection criteria could be for example one or more of the following: Certain country codes of the user identifier lead to a certain PCRF, certain network codes of the user identifier lead to a certain PCRF, the number part of the user identifier is used for selecting a certain PCRF (to get a more randomized distribution between the PCRF entities e.g. to balance the loading) e.g. so that certain ranges lead to a certain PCRF or checking whether a PCRF has already been allocated for the user identity and selecting the same PCRF for requests with the same user identity. Alternatively, the home network PCRF itself may use the user identifier for selecting a PCRF entity from the PCRFs available to it in the visited network, i.e. from the "PCRF cloud" of the visited network. Then the home network PCRF may send the session information directly to the selected PCRF in the visited network. Similarly, the visited network PCRF may also send the information (e.g. the user identification parameter and possibly other parameters) to the "PCRF cloud" of the home network.

Stated in other words, exemplary embodiments of the present invention may comprise one or more (in any conceivable combination) of the following features for session/media binding to a common control.

In session registration, e.g. IMS registration, retrieving of a user identification parameter (e.g. IMSI) from a register 180 or HSS 70, and storing the IMSI. This retrieving and storing may be performed by an AF/P-CSCF entity 30.

In session registration, e.g. IMS registration, storing the public user identity in association with the extracted user identification parameter, e.g. storing the IMPU received in the registration response from the S-CSCF 60. This storing may be performed by an AF/P-CSCF entity 30.

In session handling, e.g. IMS session establishment or modification, retrieving the user identification parameter in accordance with a public user identity, e.g. retrieving the IMSI corresponding to the IMPU, and sending the thus retrieved IMSI in a message (e.g. in a push message) to the PCRF cloud 40 with other session related parameters. This retrieving and sending may be performed by an AF/P-CSCF entity 30.

According to another exemplary embodiment of the present invention, in session handling, e.g. IMS session establishment or modification, retrieving the user identification parameter in accordance with a public user identity, e.g. retrieving the IMSI corresponding to the IMPU, and using the user identification parameter for selecting a PCRF entity 41, 42, 43 by the AF/P-CSCF 30 itself. Furthermore, the AF/P-CSCF entity 30 may also send the IMSI to other network elements or network devices 100 that may need to contact the same PCRF 41, 42, 43.

In bearer handling, e.g. user/transport plane bearer establishment or modification, obtaining a corresponding user identification parameter, e.g. obtaining the user identifier, e.g. IMSI from the bearer establishment/modification signaling (e.g. PDP context establishment/modification), and sending the user identifier, e.g. IMSI to the PCRF cloud 40. This obtaining may be performed by a PCEF/GW 50 entity needing to contact the PCRF 41, 42, 43.

According to another exemplary embodiment of the present invention, in bearer handling, e.g. user/transport plane bearer establishment or modification, obtaining a corresponding user identification parameter, e.g. obtaining the user identifier, e.g. IMSI from the bearer establishment/modification signaling (e.g. PDP context establishment/modification), using the user identification parameter for selecting a PCRF 41, 42, 43 entity by the PCEF/GW 50 itself. Furthermore, the PCEF/GW entity 50 may also send the user identity or the IMSI to other network elements that may need to contact the same PCRF.

In PCRF discovery, establishing a binding for policy-controlled sessions of the user to a (logical) policy control entity 41, 42, 43 on the basis of the user identification parameter 210, 220, the PCRF cloud 40 (i.e. typically one control element in the cloud) may use the parameter values of the user identifier, e.g. IMSI for allocating the same PCRF/control entity 41, 42, 43 to policy control sessions using/indicating the same the user identifier 210, 220, e.g. IMSI. The thus selected PCRF entity 41, 42, 43 may indicate its contact info/address to the contacting network elements or network devices in its response so as to allow a direct communication without an intermediate entity at the edge of the cloud 40.

In addition, the first PCRF 41, 42, 43 getting the user identification parameter, i.e. user IMSI or user identity, e.g. from a gateway may send the user identification parameter to a further PCRF cloud. This may be required e.g. in a roaming case with local breakout, where there is a PCRF 41, 42, 43 or PCRF cloud 40 both in the visited network and in the home network.

The selected PCRF 41, 42, 43, receiving messages both from AF/P-CSCF 30 and PCEF/BBERF 50 (or even from another network's PCRF) may use the user identities 210, 220 received in the messages to perform session binding, i.e. to bind a certain application/IMS/SIP session to the same user's user/media plane session (i.e. IP-CAN session).

In a further embodiment, the PCRF cloud 40, e.g. a Diameter routing agent DRA, may retrieve the user or UE identity/identities from a register, e.g. from a subscriber profile repository (SPR), when receiving a session request message, e.g. from an AF/P-CSCF 30, corresponding to the request message (i.e. step 13 in FIG. 6) but without IMSI, or when receiving a request message from the AF/P-CSCF 30 triggered by other events, e.g. by an ongoing user registration or the AF/P-CSCF 30 requesting the PCRF cloud 40 to report user plane or bearer related events to the AF/P-CSCF 30. If the PCRF cloud 40 or a PCRF entity 40, 42, 42, 43 or DRA retrieves the user or UE identity/identities 210, 220 before any user session establishment, e.g. triggered by a user registration to IMS, the PCRF cloud 40 or PCRF entity 40, 42, 42, 43 or DRA may save the user or UE identity/identities 210, 220 and use it/them for finding a common PCRF 41, 42, 43 and/or session binding also later, when a user session is established.

The request may be further sent or redirected to an application/IMS related register 180 (in the same or in another network) that may maintain the application/IMS subscriber related data and user or UE identities 210, 220. Thus, the register 180 may send related user or UE identities 210, 220 of the user 10 in a reply message. For example, the SPR could be a front end register (contacted by the PCRF cloud 40 or PCRF entities 41, 42, 43 or DRA) and a user data repository (UDR) could be a user data holding register 180 (either in the same network or e.g. in the user's home network) contacted by the SPR to get the user or UE identity/identities 210, 220.

When the PCRF cloud or the PCRF 41, 42, 43 or DRA receives the user or UE identity/identities 210, 220 from the register 180, the PCRF cloud or DRA or PCRF 41, 42, 43 may check whether (any of) the retrieved user or UE identity/identities 210, 220 matches with the user or UE identities 210, 220 that have already been allocated a PCRF 41, 42 or 43. A PCRF 41, 42 or 43 may already have been allocated for a user 10 or user or UE identity 210, 200, because the PCEF/BBERF entity 50 may have requested it upon the default bearer establishment. If a PCRF 41, 42, 43 has already been allocated for the user or UE identity, the same PCRF 41, 42 or 43 (for example the first PCRF 41) may be selected for the session request. Otherwise, i.e. if no PCRF has been allocated for the identity, any other PCRF 41, 42, 43 may be selected.

In a still further exemplary embodiment of the present invention, messages 7 to 12 in FIG. 6 may be not IMS registration messages, but e.g. authentication and/or authorization messages sent/received by an application function or by a gateway to/from a server. The server may itself hold/maintain the user or UE identities or perform a further request/query to get the required user or UE identity/identities from a relevant register.

In other words, according to exemplary implementation embodiments of the present invention it may be provided:

The AF/P-CSCF 60 may copy and store the user or UE identifier parameter 210, 220 retrieved from the register 180 or a server, such as a HSS 70, and later, upon session establishments or modifications, may forward the identifier parameter 210, 220 with session information to the PCRF 41, 42, 43 or PCRF cloud 40, or alternatively, the AF/P-CSCF 30 may use itself the parameter for selecting a PCRF entity 41, 42, 43. No new messages for the AF/P-CSCF 30 may be needed. There may be one additional parameter (e.g. Diameter AVP (attribute-value-pair) in the 3GPP Rx and/or Rx+ and/or S9 interface) in the message Gateways contacting the PCRF 41, 42, 43 or PCRF cloud 40 may copy the user identifier parameter 210, 220 from the bearer establishment or modification message and send it to the PCRF 41, 42, 43 or PCRF cloud 40 in an authorization request, or alternatively, the gateways themselves may use the identifier parameter 210, 220 for selecting a PCRF entity 41, 42, 43. No new messages for the gateways may be needed. There may be one additional parameter (e.g. Diameter AVP (attribute-value-pair) in the 3GPP Gx or S7 interface) in the message.

Gateways contacting the PCRF 41, 42, 43 or PCRF cloud 40 may copy the user or UE identifier parameter 210, 220 from the bearer establishment or modification message and send it to the PCRF 41, 42, 43 or PCRF cloud 40 in an authorization request, or alternatively, the gateways themselves may use the identifier parameter 210, 220 for selecting a PCRF entity 41, 42, 43. No new messages for the gateways may be needed. There may be one additional parameter (e.g. Diameter AVP (attribute-value-pair) in the 3GPP Gx or S7 interface) in the message.

The PCRF 41, 42, 43 may need to send the user or UE identifier 210, 220 to the PCRF cloud 40 of another network in a roaming case. The user or UE identifier 210, 220 may be available in the interface protocol between PCRFs 41, 42, 43 (e.g. S9 interface in 3GPP SAE). The selected PCRF 41, 42, 43 may use the user or UE identity for session binding.

Figure 7:
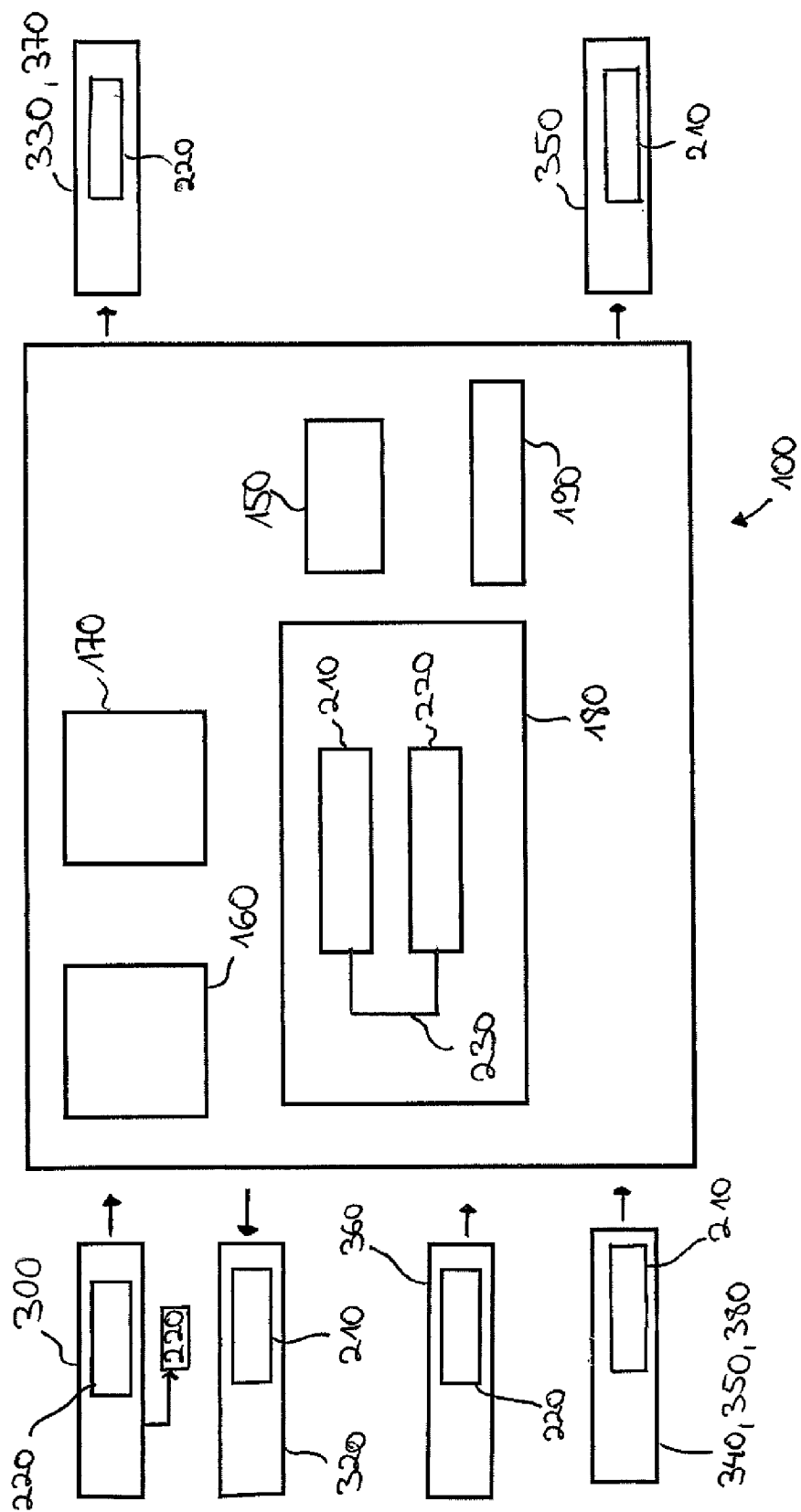

FIG. 7 illustrates a network device 100 according to an exemplary embodiment of the present invention. The network device 100 may comprise a processor 150, a sending unit 160, a receiving unit 170 and a register 180. The receiving unit 170 may receive messages and the sending unit 160 may send messages, wherein the receiving unit 170 and sending unit 160 may be combined within one single unit or combined with the processor 150. Moreover, the network device 100 may comprise a memory 190 which may be accessible by the processor 150. The processor 150, the sending unit 160, the receiving unit 170, the register 180 and the memory 190 may be connected to each other, respectively, in order to support several functionalities of the network device 100.

In FIG. 7 a user or a UE 10 may perform a user plane bearer establishment on a plane level as first level 510 and may perform in addition a session establishment on an application level as second level 520. The network device 100 may receive a first message 300 comprising a second identity 220. Extracting the second identity 220 from the first message 310 is also indicated in FIG. 7. This may be performed for example by the processor 150 of the network device 100. In the register 180 or in the memory 190 the first identity 210 and the second identity 220 may be stored. The processor 150 may provide a correspondence 230 between the first identity 210 and the second identity 220 identifying the same user/UE 10. Moreover, a second message 320 may be sent by the network device 100, wherein the second message 320 may comprise the first identity 210 in order to prepare a binding between two different sessions of the user/UE 10.

Within the network comprising several network devices 100 messages may be sent from one network device 100 to another network device 100 as for example illustrated in FIG. 6. For example a message may be sent from the UE 10 to session control entity 30 in step 6 of FIG. 6, which may be a P-CSCF 30. This message may comprise the second identity 220 of the UE 10 and may be forwarded from the P-CSCF 30 to a further network device 100 or to a session control entity, which is in this exemplary embodiment an S-CSCF 60. The S-CSCF 60 may send the first message 300 (for example in step 9 message 309) comprising the second identity 220 to a further network device 100, which may be a server, for example a HSS 70 as illustrated in FIG. 6. The server 70 may send a message 320 (for example in step 10 message 310) comprising the first identity 210 to the S-CSCF entity 60 or directly to the P-CSCF 30.

Moreover, the network device 100 illustrated in FIG. 7 may send a third message 330 comprising one identity, for example the second identity 220. Further messages may be received and sent by a network device 100 such as entities 10, 20, 30, 40, 50, 60, 70 as indicated in FIG. 6. Moreover, a fourth message 340 (for example in step 11 message 311) a fifth message 350 (for example in step 13 message 313), a sixth message 360, a seventh message 370, a eight message 380, etc. may be received and sent as indicated in FIG. 7 as an exemplary embodiment of the present invention.

Figure 8:
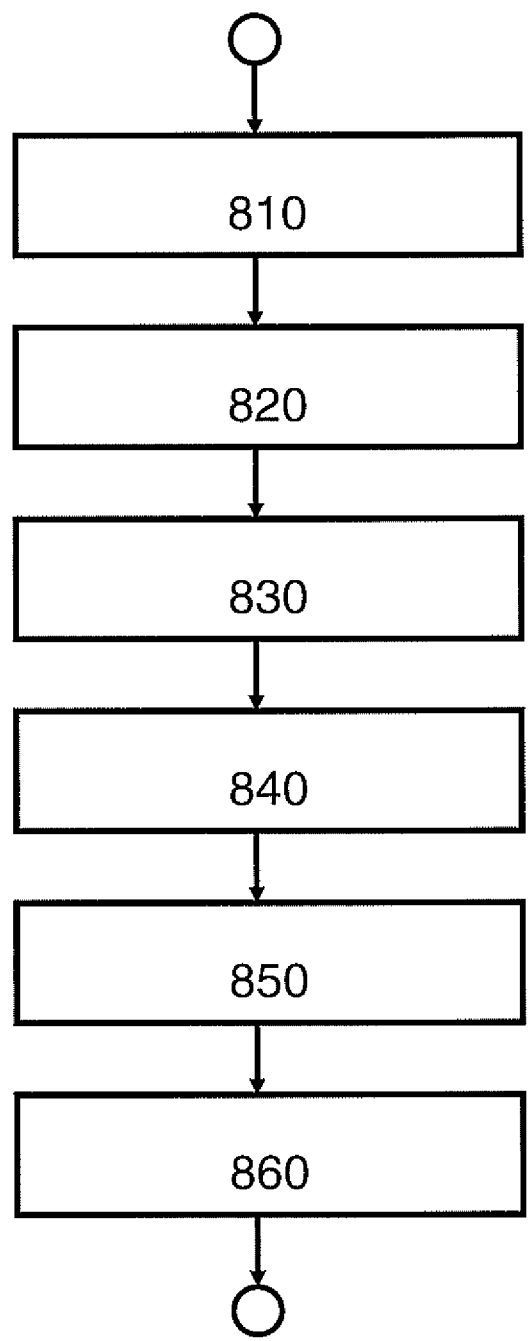
FIG. 8 illustrates a method according to an exemplary embodiment of the present invention.

FIG. 8 illustrates a method according to an exemplary embodiment of the present invention. In this method a binding for two separate sessions may be established.

The method for establishing a binding between a plurality of separate sessions may comprise storing a first identity 210 of a first level 510 in a first step 810, storing a second identity 220 of a second level 520 in a second step 820, providing a correspondence 230 between the first identity 210 and the second identity 220 in a third step 830, extracting the second identity 220 from a first message 310 in a fourth step 840, retrieving the stored first identity 210 on the basis of the extracted second identity 220 in a fifth step 850 and establishing a binding between a first session of the first level 510 and a second session of the second level 520 on the basis of the retrieved first identity 210 in a sixth step 860.

It may be foreseen that the steps 810 to 860 may be performed in a different order, for example firstly storing a second identity 220 of the second level in a register 180 and afterwards storing a first identity 210 of a first level in the register 180.

It may be also foreseen that several steps are performed simultaneously in time. The method may comprise further steps such as sending and receiving further messages, storing further data, forwarding information, forwarding messages, forwarding information elements and performing an information exchange between network devices or within one network device.

According to exemplary embodiments of the present invention there is provided a method and structural means for session and media binding to a common control, in particular to a common policy control. Moreover, there are provided means for allocating a common control, in particular e.g. the same PCRF 41, 42 or 43, to user sessions, in particular e.g. policy control sessions of the same user equipment and means for the common control/PCRF 41, 42, 43 to perform session binding between the application level and the user/media plane or user/media level. Although these means are generally applicable to different underlying system architectures, networks or technologies, one exemplary application area is the use in policy control in an IMS multiple-access system in accordance with 3GPP standards. Such means may be suitable for being applied in an evolved network architecture (SAE) where policy control elements (PCRF) and various gateways of both home and/or visited network may be involved, and where a user or user equipment may have simultaneous access through different access networks in order to find a common PCRF entity. Such means may for example involve extracting and storing a user identity at an IMS registration phase, and corresponding user identities upon bearer establishment, and using these for control session binding by a PCRF pool.

In this context, "first", "second", "third", etc. in relation to levels or messages may not be understood as hierarchy, it should be understood only to distinguish different levels or different messages from each other. It should be noted, that arrows in FIG. 6 and FIG. 7 may indicate the direction of message flow, for example indicating receiving or sending a message for a respective device.

Any functions, methods and operations described above may of course be implemented by way of software and/or hardware.

In general, it is to be noted that respective functional elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Furthermore, method steps and functions likely to be implemented as software code portions and being run using a processor at one of the entities are software code independent and can be specified using any known or future developed programming language such as e.g. Java, C++, C, and Assembler. Method steps and/or devices or means likely to be implemented as hardware components at one of the entities are hardware independent and can be implemented using any known or future developed hardware technology or any hybrids of these, such as MOS, CMOS, BiCMOS, ECL, TTL, etc, using for example ASIC components or DSP components, as an example. Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to those skilled in the art.

Generally, for the purpose of the present invention as described herein, it should be noted that
    a communication device or terminal may for example be any device by means of which a user may access a network and/or a server of such network; this implies mobile as well as non-mobile devices and networks, independent of the technology platform on which they are based; only as an example, it is noted that terminals operated according to principles standardized by the 3$^{rd}$ Generation Partnership Project 3GPP and known for example as UMTS terminals (Universal Mobile Telecommunication System) are particularly suitable for being used in connection with the present invention, nevertheless terminals conforming to standards such as GSM (Global System for Mobile communications) or IS-95 (Interim Standard 95) may also be suitable;

networks referred to in this connection may comprise mobile and fixed network sections independent of the type of technology on which the networks are operated, for example those networks operate on the basis of the Internet Protocol IP, independent of the protocol version (IPv4 or IPv6), or on the basis of any other packet protocol such as User Datagram Protocol UDP, etc.

devices can be implemented as individual devices, devices may also be implemented as a module configured to accomplish interoperability with other modules constituting an entire apparatus, e.g. a module device may be represented as a chipset or chip card e.g. insertable and/or connectable to an apparatus such as a mobile phone, or a module may be realized by executable code stored to a mobile phone or other device for execution upon invocation.

an access technology via which signaling is transferred to and from a network element or node may be any technology by means of which a node can access an access network (e.g. via a base station or generally an access node). Any present or future technology, such as WLAN (Wireless Local Access Network), WiMAX (Worldwide Interoperability for Microwave Access), BlueTooth, Infrared, and the like may be used; although the above technologies are mostly wireless access technologies, e.g. in different radio spectra, access technology in the sense of the present invention implies also wirebound technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto, usable access networks may be any device, apparatus, unit or means by which a station, entity or other user equipment may connect to and/or utilize services offered by the access network; such services include, among others, data and/or (audio-) visual communication, data download etc.;

a user equipment may be any device, apparatus, unit or means by which a system user or subscriber may experience services from an access network, such as a mobile phone, personal digital assistant PDA, or computer;

method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

Although described above mainly with respect to methods, procedures, an apparatus and modules thereof, it is to be understood that the present invention also covers a computer program products for implementing such methods or procedures and/or for operating such apparatuses or modules, as well as computer-readable (storage) media for storing such computer program products. The present invention also covers any conceivable combination of method steps and operations described above, and any conceivable combination of nodes, apparatuses and modules described above, as long as the above-described concepts of methodology and structural arrangement are applicable.

Furthermore, the network devices or network elements and their functions described herein may be implemented by software, e.g. by a computer program product for a computer, or by hardware. In any case, for executing their respective functions, correspondingly used devices, such as an interworking node or network control element, like an MGCF of an IMS network comprise several means and components (not shown) which are required for control, processing and communication/signaling functionality. Such means may comprise, for example, a processor unit for executing instructions, programs and for processing data, memory means for storing instructions, programs and data, for serving as a work area of the processor and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), interface means for establishing links and/or connections under the control of the processor unit (e.g. wired and wireless interface means, an antenna, etc.) and the like.

Many modifications and other embodiments of the inventions set forth herein will come to mind to one skilled in the art to which these inventions pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

Even though the invention is described above with reference to the examples according to the accompanying drawings, it is clear that the invention is not restricted thereto. Rather, it is apparent to those skilled in the art that the present invention can be modified in many ways without departing from the scope of the inventive idea as disclosed in the appended claims.

It should be noted, that the term "comprising" does not exclude other elements or steps and the "a" or "an" does not exclude a plurality. Also elements described in association with different embodiments may be combined, for example embodiments of an apparatus or network device may be also valid for the method and vice versa.

It should be noted, that reference signs in the claims shall not be construed as limiting the scope of the claims.

LIST OF ABBREVIATIONS

3GPP 3$^{rd}$ generation partnership project
AAA Authentication, Authorization and Accounting
AF Application function
AVP Attribute value pair
BBERF Bearer binding and event reporting function
CN Core network
CSCF Call session control function
DRA Diameter routing agent
GW Gateway
HPLMN home public land mobile network
HSS Home Subscriber Server
ID Identity, Identifier
IM IP multimedia
IMS IP multimedia subsystem
IMSI International mobile subscriber identity
IP Internet protocol
IP-CAN IP connectivity access network
MME Mobility management entity
MGW Media gateway
MNC Mobile network code
MSIN Mobile subscriber identification number
NW Network
PCC Policy and charging control
PCEF Policy and charging enforcement function
P-CSCF Proxy call session control function
PCRF Policy and charging rules function
PLMN Public land mobile network
PS Packet switched
SAE System architecture evolution
S-CSCF Serving call session control function
SDP Session description protocol
SGSN Serving GPRS support node
SIP Session initiation protocol
SNR Serial number
SPR Subscriber profile repository
TAC Type allocation code
TD Technical document
TR Technical report
TS Technical specification
UDR User data repository
UE User equipment
VPLMN Visited public land mobile network

The invention claimed is:

1. A method for establishing a binding between a plurality of separate sessions, comprising:
storing a first identity of a first level, wherein the first level corresponds to a user or media plane level;
storing a second identity of a second level, wherein the second level corresponds to an application level, and the first level and the second level are different levels of communication;
providing a correspondence between the first identity and the second identity;
extracting the second identity from a first message;
retrieving the stored first identity on the basis of the extracted second identity;
establishing a binding between a first session of the first level and a second session of the second level on the basis of the retrieved first identity, wherein the binding between the first session of the first level and the second session of the second level is established by selecting a policy control entity out of a plurality of policy control entities, the selecting being based on the retrieved first identity, the first identity comprises an international mobile subscriber identity, and the establishing the binding comprises forwarding the international mobile subscriber identity from a proxy-call-session-control function to a policy-and-charging-rules function.

2. The method according to claim 1, the method further comprising:
sending the first message comprising the second identity, wherein the second identity is an identity on a network device or on a user.

3. The method according to claim 2, the method further comprising:
selecting a common policy and charging control function for two network devices serving the user.

4. The method according to claim 1, the method further comprising:
sending the first message in a user related procedure, wherein the user related procedure is at least one procedure selected from the group of procedures consisting of a registration, an authentication, an authorization, a session establishment and an attachment to a network.

5. The method according to claim 2,
wherein storing the first identity and storing the second identity is performed in a home network of the user and wherein retrieving the second identity from the first message is performed in a visited network.

6. The method according to claim 1, the method further comprising:
replying in response to the first message with a second message comprising the first identity.

7. The method according to claim 1, the method further comprising:
sending the retrieved first identity to a first session control entity.

8. The method according to claim 7, the method further comprising:
forwarding the first identity from the first session control entity to a second session control entity.

9. The method according to claim 1, the method further comprising:
sending a third message from a session control entity to the policy control entity, wherein the third message comprises the second identity.

10. The method according to claim 7, the method further comprising:
sending a fourth message from the session control entity to the policy control entity, wherein the fourth message comprises the retrieved first identity.

11. The method according to claim 1,
the method further comprising:
performing an information exchange between a session control entity and the policy control entity, wherein the information exchange comprises the retrieved first identity.

12. The method according to claim 1, wherein the first identity and/or the second identity is at least one identity selected from the group of identities consisting of an international code, a international identity, a country code, a country code of a user identity, a network code, a network code of a user identity, an International Mobile Subscriber Identity (IMSI), a mobile country code, (MCC), a mobile network code (MNC) and a mobile subscriber identification number (MSIN), a private identity, a private identity, private user identity, a private user identity of IMS, a public identity, a public user identity, a public user identity of IMS, a UE identity, a International Mobile station Equipment Identity (IMEI), a type allocation code (TAC), a serial number (SNR), an IP address, number part of an identity, a number part of a user identity and a range number.

13. Network device comprising
a processor,
wherein the processor is adapted
to store a first identity of a first level in a register, wherein the first level corresponds to a user or media plane level;
to store a second identity of a second level in the register, wherein the second level corresponds to an application level, and the first level and the second level are different levels of communication;
to provide a correspondence between the first identity and the second identity;
to extract the second identity from a first message;
to retrieve the first identity from the register corresponding to the extracted second identity;
to reply with a second message comprising the first identity in response to the first message for establishing a binding between a first session of the first level and a second session of the second level on the basis of the retrieved first identity, wherein the binding between the first session of the first level and the second session of the second level is established by selecting a policy control entity out of a plurality of policy control entities, the selecting being based on the retrieved first identity, the first identity comprises an international mobile subscriber identity, and the establishing the binding comprises forwarding the international mobile subscriber identity from a proxy-call-session-control function to a policy-and-charging-rules function.

14. Network device comprising
a processor,
wherein the processor is adapted
to send a first message comprising a second identity of the second level;
to receive a second message comprising a first identity of a first level in response of sending the first message, wherein a correspondence between the first identity and the second identity is established, the first level corresponds to a user or media plane level, the second level corresponds to an application level, and the first level and the second level are different levels of communication;
to send a third message comprising the first identity for establishing a binding between a first session of the first level and a second session of the second level on the basis of the first identity, wherein the binding between the first session of the first level and the second session of the second level is established by selecting a policy control entity out of a plurality of policy control entities, the selecting being based on the received first identity, the first identity comprises an international mobile subscriber identity, and the establishing the binding comprises forwarding the international mobile subscriber identity from a proxy-call-session-control function to a policy-and-charging-rules function.

15. Network device comprising
a processor,
wherein the processor is adapted
to receive a first message comprising a first identity of a first level from a network device of a second level, wherein the first level corresponds to a user or media plane level, the second level corresponds to an application level, and the first level and the second level are different levels of communication;
to establish a binding between a first session of the first level and a second session of the second level on the basis of the first identity, wherein the binding between the first session of the first level and the second session of the second level is established by selecting a policy control entity out of plurality of policy control entities, the selecting being based on the received first identity, the first identity comprises an international mobile subscriber identity, and the establishing the binding comprises forwarding the international mobile subscriber identity from a proxy-call-session-control function to a policy-and-charging-rules function.

16. Network device comprising
a processor,
wherein the processor is adapted
to receive a first message comprising a second identity of a second level;
to forward the first message to a register;
to receive a second message comprising a first identity of a first level in response to the first message, wherein a correspondence between the first identity and the second identity is established for a session binding between a first session of the first level and a second session of the second level on the basis of the first identity, wherein the binding between the first session of the first level and the second session of the second level is established by selecting a policy control entity out of plurality of policy control entities, the selecting being based on the received first identity, the first level corresponds to a user or media plane level, the second level corresponds to an application level, and the first level and the second level are different levels of communication, the first identity comprises an international mobile subscriber identity, and the establishing the binding comprises forwarding the international mobile subscriber identity from a proxy-call-session control function to a policy-and-charging-rules function.

17. Network device of claim 13, wherein
the network device is at least one network device selected from the group of network devices consisting of a server, a home subscriber server (HSS), a AAA, an identity manager, a data repository, a proxi call session control server function entity (P-CSCF), an application function entity (AF), a policy and charging control function entity (PCRF), a serving call session control function entity (S-CSCF), a gateway (GW), a policy enforcement function entity (PCEF), a DRA, a UE , a policy control entity, a cloud and a bearer binding and event reporting function entity (BBERF).

18. Computer program product stored on a non-transitory computer readable medium, the computer program product comprising code portions for causing a network device, on which the computer program is executed, to carry out the method according to claim 1.

* * * * *